(12) United States Patent
Lee et al.

(10) Patent No.: US 8,602,587 B2
(45) Date of Patent: Dec. 10, 2013

(54) LED LAMP TUBE

(75) Inventors: Ke-chin Lee, Taipei (TW); Shih-chiang Lin, Taipei (TW)

(73) Assignee: Zhongshan Weiqiang Technology Co., Ltd., Zhongshan (CN)

( * ) Notice: Subject to any disclaimer, the term of this patent is extended or adjusted under 35 U.S.C. 154(b) by 231 days.

(21) Appl. No.: 13/105,171

(22) Filed: May 11, 2011

(65) Prior Publication Data

US 2012/0043884 A1   Feb. 23, 2012

(30) Foreign Application Priority Data

Aug. 18, 2010  (CN) .......................... 2010 1 0258948
Oct. 22, 2010  (CN) .......................... 2010 1 0522821

(51) Int. Cl.
*F21S 4/00*  (2006.01)
(52) U.S. Cl.
USPC .............. 362/225; 362/217.14; 362/217.16; 362/249.02
(58) Field of Classification Search
USPC ............ 362/549, 219, 217.17, 236, 240, 244, 362/246, 249.02, 249.06, 249.14
See application file for complete search history.

(56) References Cited

U.S. PATENT DOCUMENTS

| | | | | |
|---|---|---|---|---|
| 4,150,417 A | * | 4/1979 | Darrow et al. | 361/198 |
| 2004/0062041 A1 | * | 4/2004 | Cross et al. | 362/240 |
| 2010/0079075 A1 | * | 4/2010 | Son | 315/152 |
| 2011/0019421 A1 | * | 1/2011 | Lai | 362/249.06 |
| 2012/0033438 A1 | * | 2/2012 | McCallum | 362/430 |

OTHER PUBLICATIONS

Terrell, David L. "7.2 Ideal Rectifier Circuits." Op Amps: Design, Application, and Troubleshooting. Boston: Butterworth-Heinemann, 1996. 291-307. Print.*

* cited by examiner

*Primary Examiner* — Diane Lee
*Assistant Examiner* — Gerald J Sufleta, II
(74) *Attorney, Agent, or Firm* — Marian J. Furst (57) ABSTRACT

An LED lamp tube comprises a tube body, at least one circuit board inside the tube body, at lease one LED module on the circuit board, and electrical connectors at the ends of the tube, wherein the tube body is an integrally formed hollow tube, and has at least one group of supporting and positioning ribs on the inner wall thereof along the length direction; the circuit board is fixed by the supporting and positioning ribs; the LED lamp tube disclosed by the present invention has a firm assembly structure with less thermal deformation, and more particularly just like the conventional fluorescent tubes it has a wide light-emitting angle, thereby providing better illumination effects.

17 Claims, 13 Drawing Sheets

FIG.23

LED LAMP TUBE

BACKGROUND OF THE INVENTION

1. Field of the Invention

The present invention relates in general to an LED lamp, and more particularly to an LED lamp tube.

2. Description of the Related Art

Fluorescent lamps are a common type of illuminating lamps people use, but at present LED lamps have been gradually replacing the conventional fluorescent lamps and becoming the main stream in the market, due to the advantages including environment friendly, energy conservation, longer lifespan, and higher efficiency.

Due to their structural characteristics, as well as in consideration of their relatively high heat production, at present the LED lamp tubes on the market usually have a common structure, in which a circuit board with a plurality of LED units is disposed inside a tube body, and connectors mounted at the two ends of the tube body are plugged into a standardized fluorescent tube fixture for fixing the tube and obtaining electrical power, the heat generated by the LED units is first conducted to the tube body through the circuit board and dissipated to the air finally. Wherein the tube body is required to play a triple role: light directing, circuit board fixing and heat dissipating, in different ways to satisfy these requirements, the tube bodies of the existing LED lamp tubes could be divided into two types: one is made of plastic tube, its front side is transparent for light and the LED circuit board is mounted inside, the light goes through the front transparent side whilst the heat generated by the LED units is conducted from the circuit board to the tube body and eventually dissipated into the air; another one includes a plastic tube and an extra aluminum heat sink mounted on the back side of the tube, the light goes through the front transparent side whilst the heat generated by the LED units is conducted from the circuit board to the aluminum heat sink and eventually dissipated into the air, whereby an enhanced heat dissipation is obtained.

The two connectors at the ends of the tube are used to fix the LED lamp tube in a lamp fixture, thereby obtaining electrical power, as an LED lamp tube in place is usually horizontally placed, wherein only the two ends of the LED lamp tube are fixed and supported, the middle portion of the LED lamp tube suffers from a downwards stress due to gravity. Under such a circumstance, for the first type of LED tube, as the plastic material will soften gradually by heat, as well as influenced by the action of gravity, the middle of the LED lamp tube will gradually deform and then to be obviously deflexed after a long period of use, the aesthetics and safety of the LED lamp tube are so impaired. For the second type of the LED tubes, as beneficiated from the supporting by the aluminum heat sink mounted on the back side, besides the better heat dissipation, the LED lamp tube will not deform easily by heat, and therefore could remain in aesthetic for a long period and has a more stable fixing. However, as using aluminum materials, the manufacturing cost is significantly increased and its market competence is so impaired. Furthermore, as fixed by the aluminum heat sink, the LED circuit is disposed more closely to the front side of the tube, the emitting angle is reduced and the lighting effect is consequently impaired.

As described above, the LED lamp tube is fixed and powered by the connectors being engaged with the lamp fixture, the metal pins mounted on the connectors of LED tube so have to be assembled accurately to engage with the holders, as well as to have adequate strength to ensure a firm fixation, and no rotation or displacement occurred when a torsional force or other external forces is applied. An existing method for that is to use adhesive to adhere the connectors to the ends of the tube, but with this method, the connectors are not removable once adhered, unless ruining the connection. Moreover, the heat generated during the operation of the LED lamp tube, would soften the adhesives, the connection may come loose under the action of gravity or other external forces after a long period of use.

In addition to above, usually a LED lamp tube is powered by an DC power converted from AC mains, but AC mains may be unstable in frequency in some cases, thereby influencing the value of the current passing through the LED units, the excessive current may lead to permanent luminous decay of the LEDs, consequently permanently degrades brightness of the LED lamp tube.

SUMMARY OF THE INVENTION

In order to solve the aforementioned problems, the present invention provides an LED lamp tube with a firm structure, higher brightness and a wider lighting angle as the conventional fluorescent tubes, and without thermal deformation.

A light emitting diode (LED) lam tube disclosed by the present invention comprises:
  a tube body;
  at least one circuit board, mounted inside said tube body and
     provided with at least one LED module; and
  electrical connectors mounted at two ends of said tube
     body;
characterized in that:
  said tube body is an integrally formed hollow tube, and
     along its length direction has at least one group of two
     supporting and positioning ribs on the inner wall
     thereof;
  said circuit board is elongated, its two opposite ends are
     clamped and fixed in said tube body by said one group of
     two supporting and positioning ribs, and said at least one
     LED module is disposed on the front side of said circuit
     board; and
  each said electrical connector comprises two protruding
     electrode pins and complies with international standards
     for fluorescent lamp tubes and fluorescent lamp fixtures,
     wherein said two electrode pins are short-circuited.

In the present invention, preferably, the tube body along its length direction has an arc-shaped strip of which back side clings to the inner wall of the tube body, said supporting and positioning ribs are integrally formed on the front side of the arc-shaped strip. The arc-shaped strip has two symmetrically arranged groups of supporting and positioning ribs relative to the vertical axis of the tube, each group of supporting and positioning ribs clamps and fixes one said circuit board, whereby the circuit boards are arranged in a separated reverse V shape (more intuitively, a "Λ" shape). The arc-shaped strip further has an integrated rib between the two groups of supporting and positioning ribs, the rib has a locking hole on each end thereof, and each said electrical connector is fixed on a corresponding locking hole by a bolt.

Alternatively, the supporting and positioning ribs can he integrally formed on the inner wall of said tube body. The tube body has two symmetrically arranged groups of supporting and positioning ribs relative to the vertical axis thereof, each group of supporting and positioning ribs clamps and fixes one circuit board, whereby two circuit boards are arranged in a separated reverse V shape (a "Λ" shape more intuitively); a gap is formed between said two groups of supporting and positioning ribs, in which a metal strip is clamped and fixed.

Each LED module comprises one or more LED units connected in series, and each circuit board comprises one or more LED modules connected in parallel.

Each circuit board comprises a bridge rectifier connected with said one or more LED modules, and a constant current source in series for current limiting, wherein the constant current source comprises a constant-current execution unit and a constant current driving unit, every two or more said LED units are first connected with each other in parallel, then altogether in series.

Alternatively, the circuit board comprises a dual half wave rectifier instead of bridge rectifier, comprising two inverse-parallel connected diodes, and a non-polar capacitor, wherein every two said LED units are inverse-parallel connected together, and then altogether in series.

The LED tube disclosed by the present invention uses supporting and positioning ribs for fixing circuit boards, whereby the plastic materials could be used in producing the LED tube to ensure a low manufacturing cost, and sufficient strength is obtained for the tube body to prevent the LED lamp tube from thermal deformation. For the configuration of supporting and positioning ribs, the present invention provides two solutions: one is a separated structure to the tube body, supporting and positioning ribs are on an arc-shaped strip which is clamped and fixed by the integrated ribs of the tube body for better structural strength; another solution is to directly integrate the supporting and positioning ribs into the tube body for better lighting effect. Anyway, the one-body formed tube used in the present invention could maximize the performance of the LEDs in lighting, just like the conventional fluorescent tubes the LED lamp tube disclosed by the present invention could have a wide light emitting angle. Furthermore, locking holes with bolts are adopted in the present invention to fix the two electrical connectors on the LED lamp tube to provide sufficient strength against torques in assembling or use, the structural lifespan is so significantly improved. The metal strip used further enhances the structural strength of the tube. In the present invention, the LED power supply circuit uses bridge or dual half wave rectification, wherein bridge rectification is used with a constant current source to ensure illumination effect as well as to prevent luminous decay caused by excessive current, whereby a longer lifespan is obtained.

BRIEF DESCRIPTION OF THE DRAWINGS

The invention can be more fully understood by reading the subsequent detailed description and examples with references made to the accompanying drawings, wherein.

DETAILED DESCRIPTION OF THE PREFERRED EMBODIMENT

Figure 1:
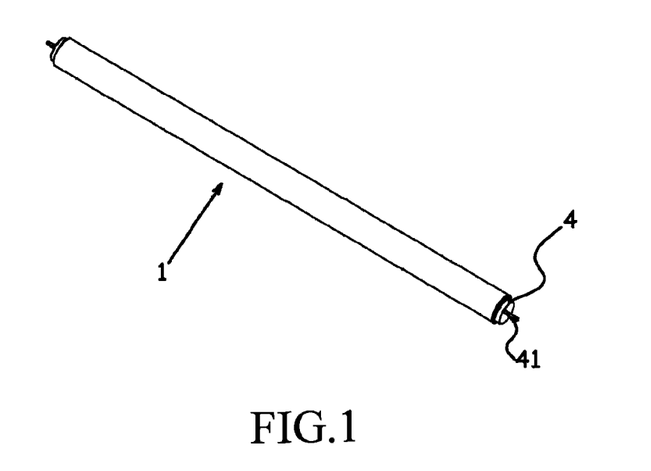
FIG. 1 is an assembled view of an LED tube according to the present invention.
Figure 2:
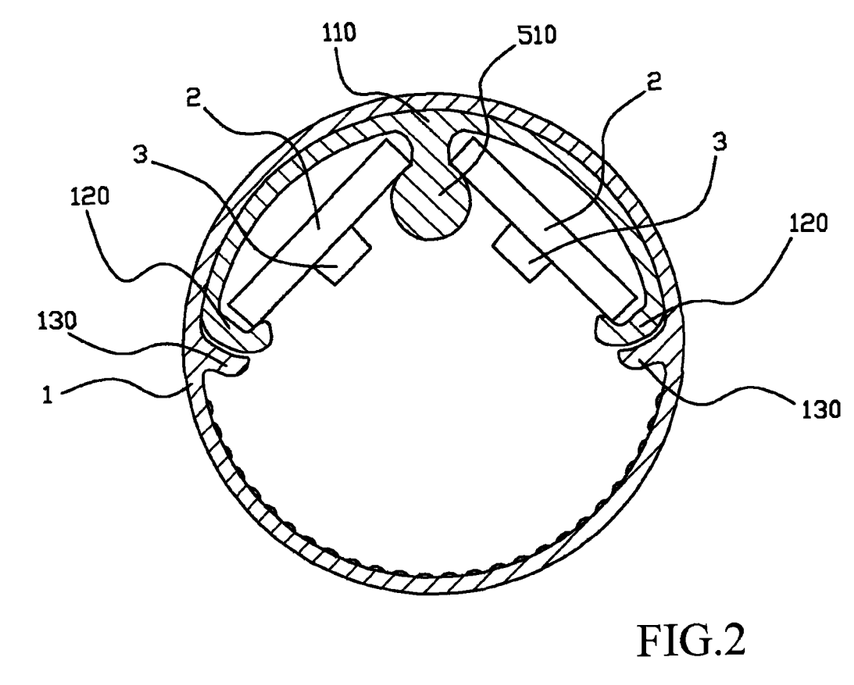
FIG. 2 is an internal schematic view of an LED tube according to the first embodiment of the present invention.

As FIGS. 1 and 2 shows, an LED lamp tube disclosed by the present invention comprises a tube body 1, two circuit boards 2 mounted inside the tube body 1, one or more LED modules 3 disposed on each circuit board 2, and two electrical connectors 4 mounted at the ends of the tube body 1, which are connected to the circuit boards 2 and has a standard dual-pin configuration, wherein the two short-circuited protruding pins 41 are used to connect the LED lamp tube to the standard fluorescent tube holders for power supplying.

In this embodiment, the tube body 1 is an integrally formed hollow and transparent tube, having wave-shaped stripes on its front side as optical lens for enlarging the light emitting angle. The tube 1 along its length direction further has two reinforcing ribs 130; an arc-shaped strip 110 is fixed by these two reinforcing ribs on the inner wall of the tube 1, and the back side of the arc-shaped strip 110 clings to the inner wall of the tube 1. In addition, the arc-shaped strip 110 has two groups of two supporting and positioning ribs 120 along the length direction on the front side thereof. An elongated circuit board 2 is clamped and fixed by each group of supporting and positioning ribs 120. In this way, the circuit board 2 is fixed inside the tube body 1 by the arc-shaped strip 110 without extra fasteners; the structure of the LED lamp tube is so simplified and becomes more reasonable.

In an embodiment of the present invention, the tube body 1 is made of Polycarbonate (PC) material, which is excellent in wear resistance, high temperature resistance, toughness and transparency, and could provide sufficient protection for the components installed inside, thereby ensuring the overall performance of the LED lamp tube. Furthermore, the arc-shaped strip 110 is made of ABS plastic material, which has sufficient hardness and is relatively cheap, as the material for the arc-shaped strip 110 for fixing circuit board 2 and supporting the shape of the tube body 1, it could provide required strength in use.

As shown by FIG. 2, the supporting and positioning ribs 120 are located closely to the back side of the tube 1, the portion of the tube body 1, which the light of the LED modules 3 placed on the front side of the circuit boards 2 could reach, is so larger than it on a conventional LED lamp tube, in other words, the LED) lamp tube disclosed by the present invention could have a larger light-emitting area. Furthermore, due to diffuse reflection, in the LED lamp tube disclosed by the present invention only a small portion of the tube body 1 behind, the circuit board 2 is slightly darker. Thus, the light emitting area is further enlarged, and an approximate effect to the 360° lighting of the conventional fluorescent tubes is so obtained.

In an embodiment as shown by FIG. 2, the arc-shaped strip 110 has two groups of supporting and positioning ribs 120 in a symmetrical arrangement relative to the vertical axis of the tube 1. group of supporting and positioning ribs 120 clamps and fixes one circuit board 2, whereby the two circuit, boards 2 are arranged. in a separated reverse V shape (more intuitively, a "/\" shape) with a certain included angle. In this way, the LED modules 3 on the two circuit boards 2 shine simultaneously; their emitting angles are partially overlapped so that the luminous intensity is enhanced and the overall light emitting angle of the lamp tube is enlarged as well. In addition, in this embodiment, the two groups of supporting and positioning ribs have a shared rib 510 in the middle of the arc-shaped. strip 110, which not only can play a role of supporting the tube body 1, but also can serve as a heat sink for conducting and dissipating heat generated by the LED modules 3.

Figure 3:
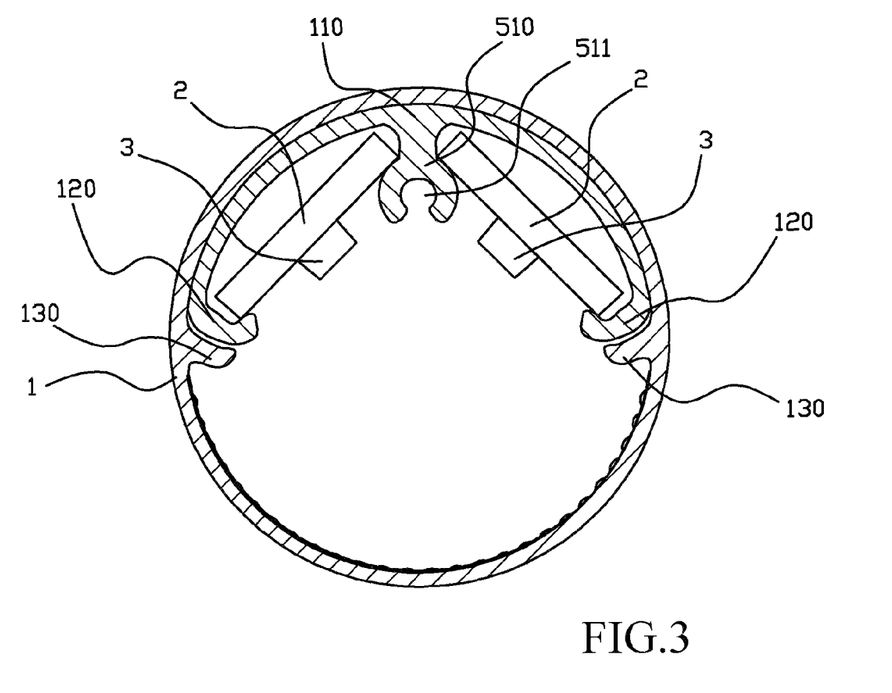
FIG. 3 is an internal schematic view of an LED tube according to the second embodiment of the present invention.
Figure 4:
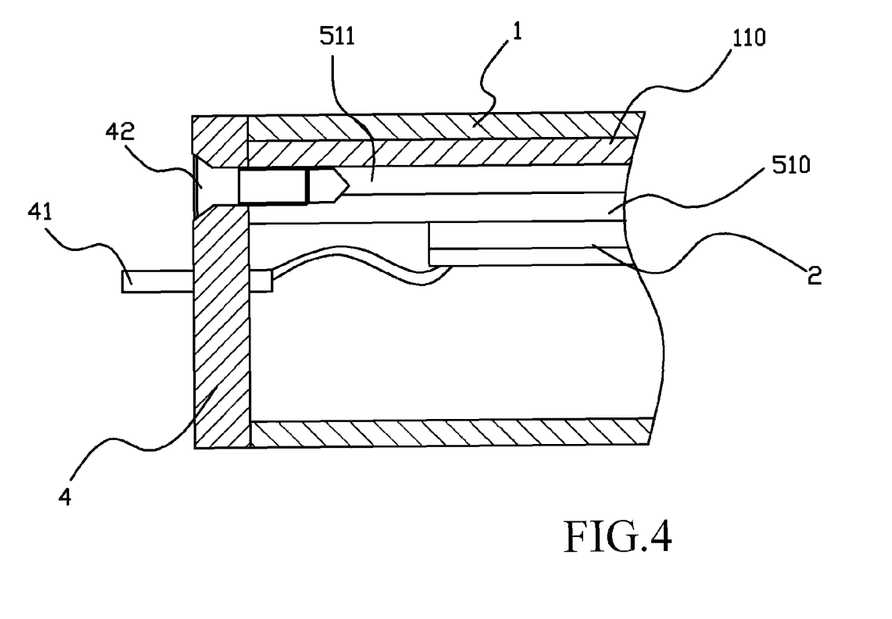
FIG. 4 is an exploded view of an LED tube according to the second embodiment of the present invention.

As shown by FIG. 3, in the second embodiment of the present invention, the configuration is basically same as the first embodiment, in which two symmetrically arranged groups of supporting and positioning ribs 120 are respectively to clamp and fix one circuit board 2, but in this embodiment the rib 510 further has a locking hole 511 on each end thereof for connecting the electrical connectors 4 to the rib 510. As shown by FIG. 4, an electrical connector 4 is fixed at one end of the tube 1 by a bolt 42 screwed into the locking hole 511, and no adhesive is required, whereby a non-destructive assembly-disassembly mechanism is achieved. In addition, as the electrical connector 4 is locked on the end of the tube 1 by the bolt 42, in assembling, the torque applied on the opposite ends of the tube 1 is insufficient to rotate or displace the electrical connector 4 from the tube body 1, thereby ensuring the structural strength and performance of the entire LED lamp tube. As shown by FIG. 3, rib 510 can be designed to have two arc-shaped ribs on the end thereof forming the locking hole 511 for more conveniences in manufacturing.

Figure 5:
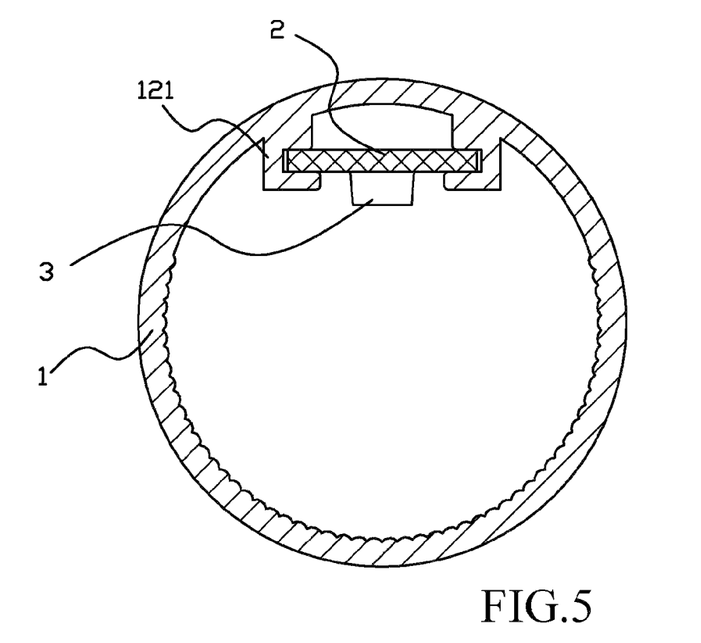
FIG. 5 is an internal schematic view of an LED tube according to the third embodiment of the present invention.

In another embodiment of the present invention, the tube body 1 and supporting and positioning ribs can be integrally formed, as FIG. 5 shows. In detail, the tube body 1 along its length direction has a group of two integrated supporting and positioning ribs 121 on the back side of the inner wall thereof, these ribs could be designed in an I or T shape for higher strength. The supporting and positioning ribs 121 can enhance the longitudinal strength of the tube body 1, making the tube body 1 not easily deform when the lamp tube is hanged transversally and in particular heated. Furthermore, the supporting and positioning ribs 121 further play a role of fixing the circuit board 2: as the circuit board 2 is elongated, each supporting and positioning rib 121 can be designed to have a notch to hold one end of the circuit board 2, thus the circuit board 2 can be tightly clamped and fixed on the inner wall of the tube body 1 by these two ribs 121. Since the circuit board 2 is fixed by this means, the portion of the tube body 1, which the light of the LED module 3 mounted on the front side of the circuit board 2 can reach, is larger than it of conventional LED tubes, an enlarged light-emitting are is so obtained.

Figure 6:
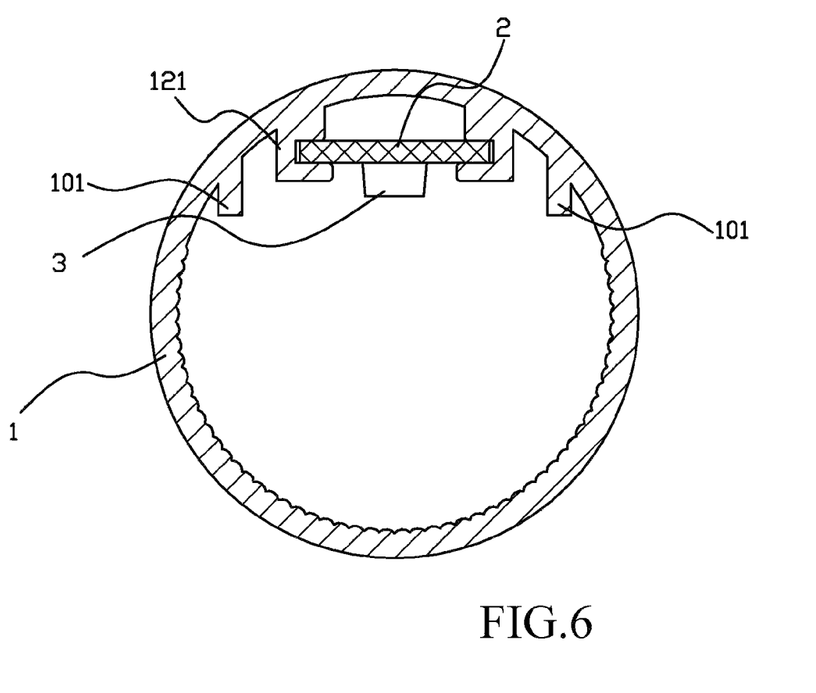
FIG. 6 is an internal schematic view of an LED tube according to the fourth embodiment of the present invention.

In the fourth embodiment as shown in FIG. 6, the tube body 1 along its length direction further comprises extra integrated reinforcing ribs 101 on the inner wall thereof. The reinforcing ribs 101 can be symmetrically arranged on the opposite sides of the supporting and positioning ribs, thereby providing higher strength.

Figure 7:
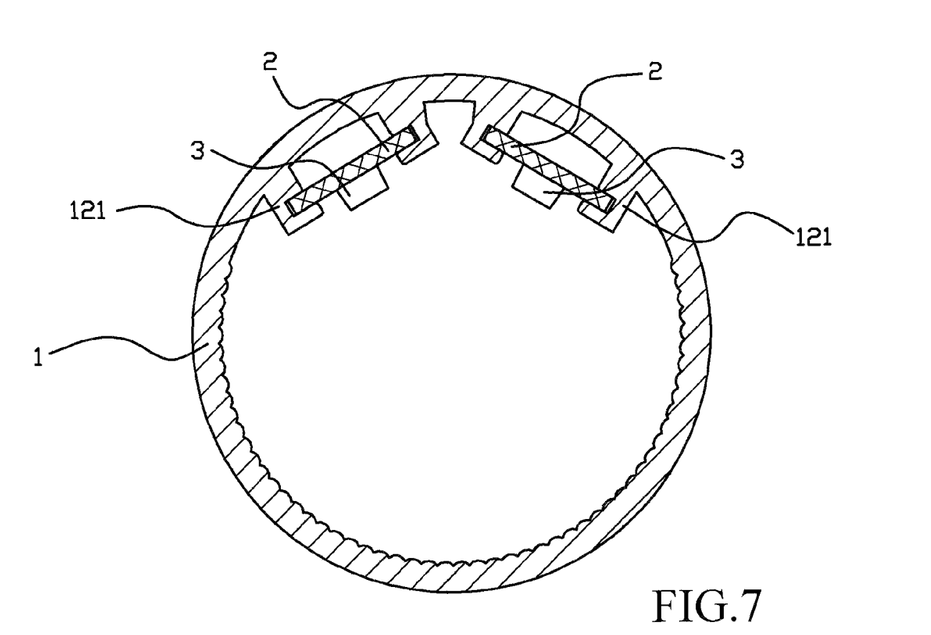
FIG. 7 is an internal schematic view of an LED tube according to the fifth embodiment of the present invention.

FIG. 7 illustrates the fifth embodiment of the present invention, wherein the tube body 1 has two groups of two supporting and positioning ribs 121 symmetrically arranged on the back side of the inner wall thereof, each group of supporting and positioning ribs 121 clamps and fixes one circuit board 2, the LED modules 3 on the two circuit boards 2 are lighting simultaneously for higher brightness. Of course, more supporting and positioning ribs 121 can be implemented to mount more circuit boards 2 for higher brightness.

As a further improvement to the above embodiment, wherein the two symmetrically arranged groups of supporting and positioning ribs 121 allow the two circuit boards 2 fixed to be arranged in a separated reverse V shape (or a "/\" shape more intuitively) with an acute angle. By this means, during operation, the LED modules on the two circuit boards are lighting simultaneously, their emitting angles are partially overlapped, allowing higher brightness and a wider illuminating angle.

Figure 8:
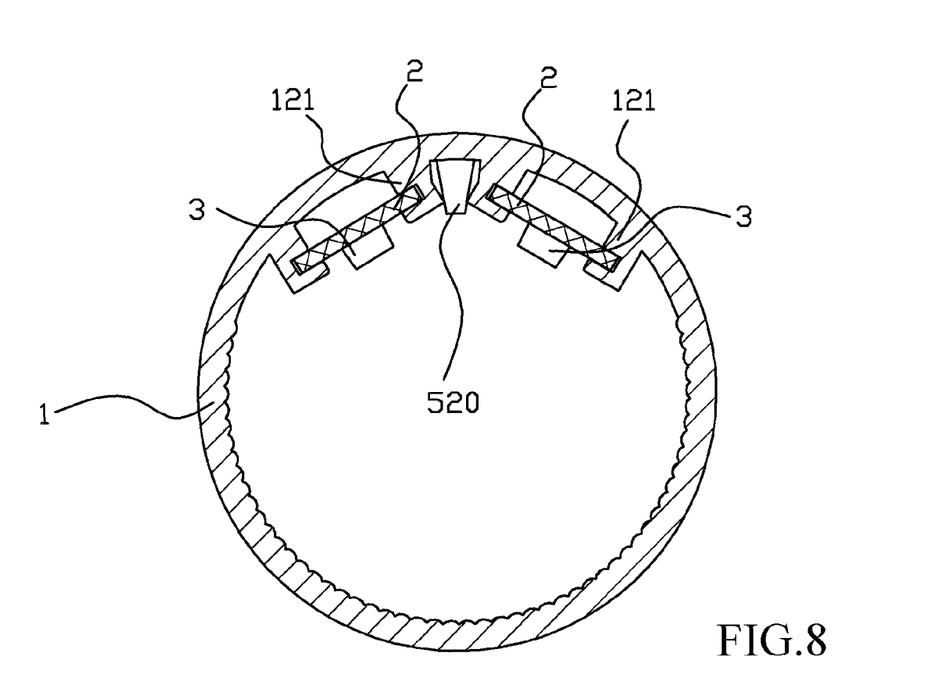
FIG. 8 is an internal schematic view of an LED tube according to the sixth embodiment of the present invention.

In the sixth embodiment of the present invention shown as FIG. 8, the LED lamp tube further comprises a metal strip 520 mounted in a gap formed between the two groups of supporting and positioning ribs, the metal strip 520 plays multiple roles including supporting the tube 1, preventing the deformation, and conducting and dissipating heat generated by the LED modules.

In the LED lamp tube provided by the present invention, the LED module 3 serves as an illuminant, comprising a plurality of LED units 310 connected in series, according to the different requirements of illumination, the number of parallel connected modules 3 on the circuit board 2 varies, to provide the illumination intensity required.

Figure 9:
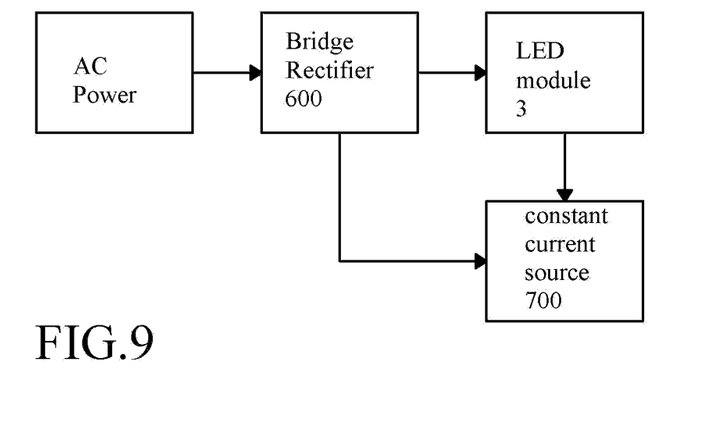
FIG. 9 is a functional block diagram of an LED tube according to an embodiment of the present invention.

As shown by FIG. 9, in a preferred embodiment of the present invention, DC power is used, and for ensuring the stability of the power supplied, the circuit board 2 further comprises a bridge rectifier 600 and a constant current source 700 for the LED module 3, wherein the constant current source 700 comprises a constant current execution unit 710 and a constant current driving unit 720, the constant current execution unit 710 controls the output current to ensuring a stable power supplying for the LED module 3, and the driving unit 720 is connected to the bridge rectifier 600 for obtaining current signal.

Figure 10:
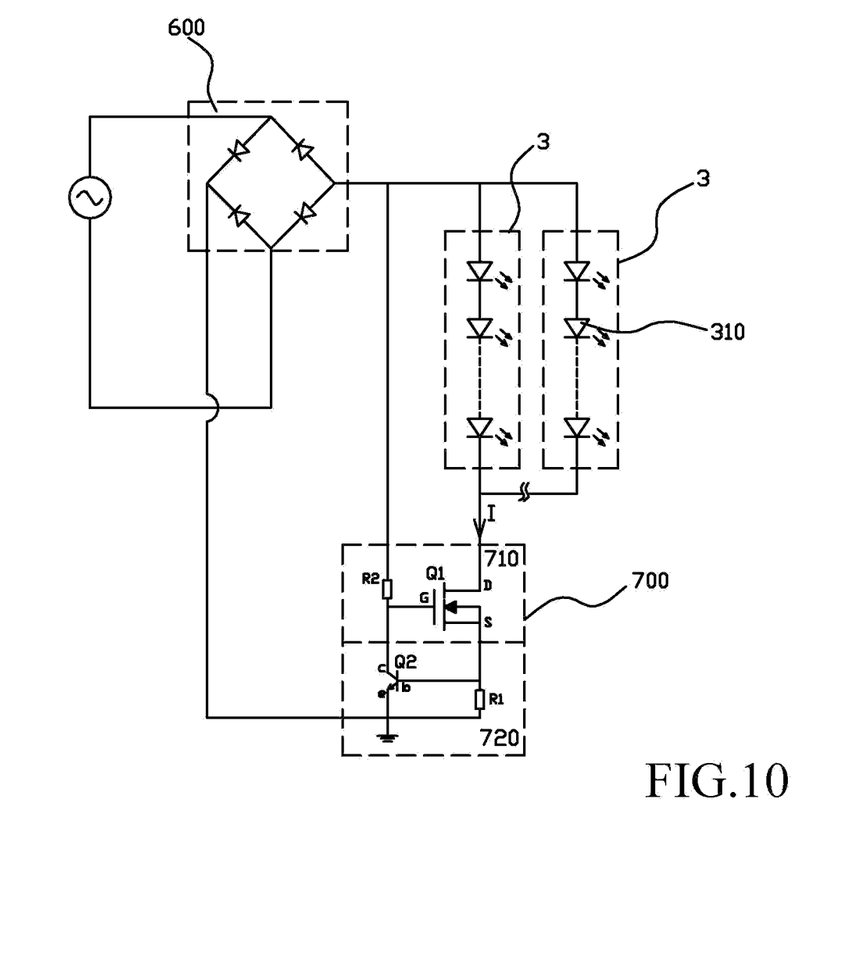
FIG. 10 is a schematic circuit diagram of an LED tube according to a preferred embodiment of the present invention.

Another preferred embodiment of the circuit of the present invention is shown as FIG. 10, wherein the constant current execution unit 710 comprises a n-MOSFET Q1, the gate G of the n-MOSFET Q1 is connected to the bridge rectifier 600 through a voltage feedback resistor R2, the drain D of the n-MOSFET Q1 is connected to the LED module 2, and the source S of the n-MOSFET Q1 is connected to the constant current driving unit 720 of the constant current source 700. The driving unit 720 comprises a current feedback resistor R1 and a NPN transistor Q2, wherein the base B of the transistor Q2 is connected to the source S of the MOSFET Q1 and grounded by the current feedback resistor R1, the collector C of the transistor Q2 is connected to the gate G of the MOSFET Q1, and the emission E of the transistor Q2 is grounded. The resistance of MOSFET Q1 is relatively low, thus the reaction speed and efficiency are relatively high.

When the input current I of the LED module 3 through the bridge rectifier 600 increases due to some reasons, the current passing through the resistor R1 and the voltage on the base of the MOSFET Q1 are increase consequently, after amplified by the MOSFET Q1, the current passing through the resistor R2 is increased, and influenced by the resistors R1 and R2 the voltage on the source of the transistor Q2 is decreased, thus the current passing through the source of the transistor Q2 is decreased, under the amplification of the transistor Q2, the current I passing through the drain of the MOSFET Q1 is decreased consequently. Similarly, when the current I decreases, the circumstance is inversed.

Figure 11:
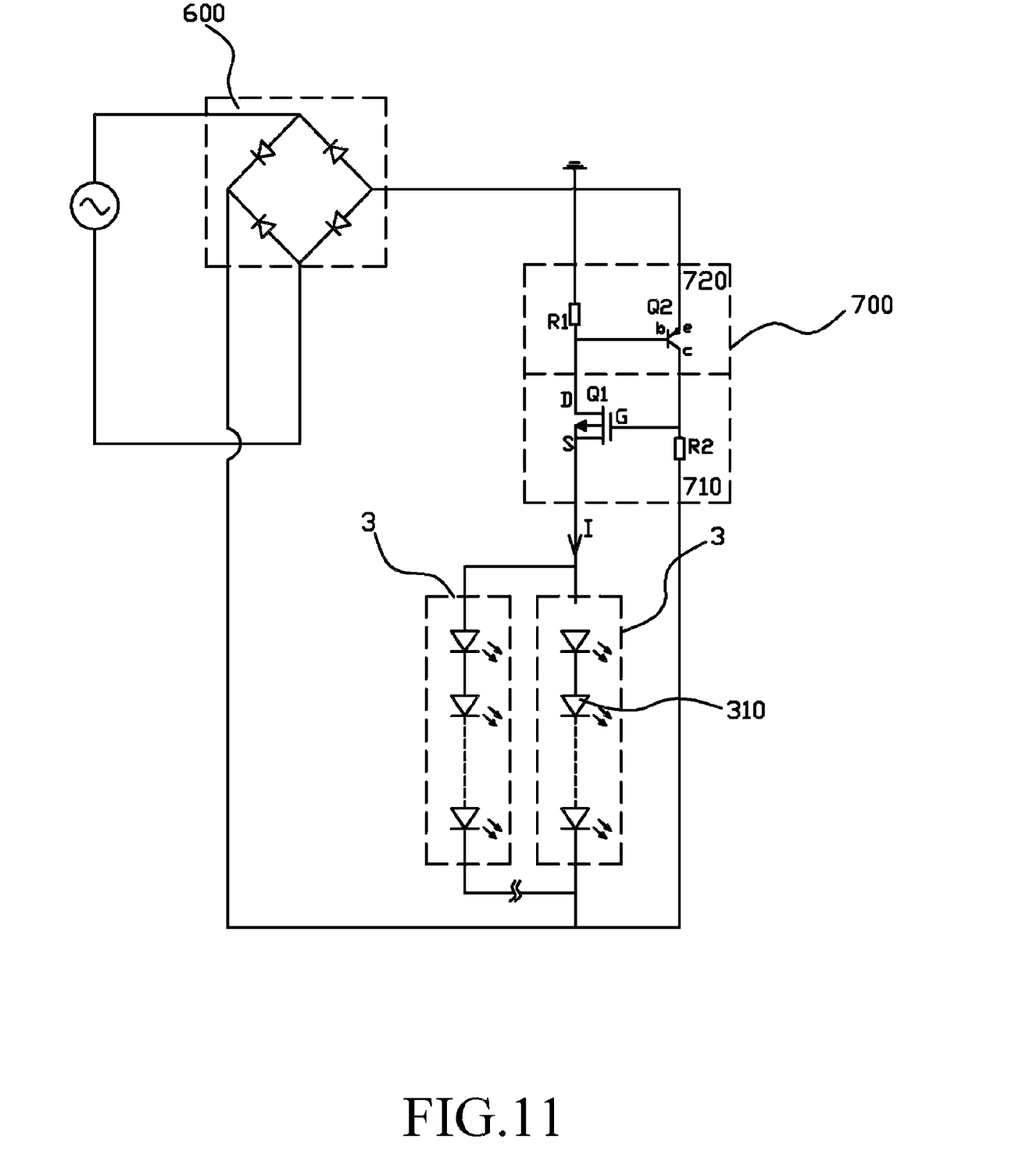
FIG. 11 is a modified schematic circuit diagram of an LED tube according to a preferred embodiment of the present invention.

The aforementioned is a basic embodiment of the preferred circuit structure of the present invention, wherein the constant current source 700 has a low potential relative to the LED module 3, but when the constant current source has a high potential relative to the LED module 3, as shown in FIG. 11, an P-MOSFET Q1 and an PNP transistor Q2 are adopted herein, wherein the gate G of Q1 is connected to the bridge rectifier 600 by a voltage feedback resistor R2, its drain D is connected to the base B of Q2, and its source S is connected to the LED module 3; the collector C of Q2 is connected to the gate G of Q1. The operation principle of the circuit is the same as the one shown in FIG. 10.

Figure 12:
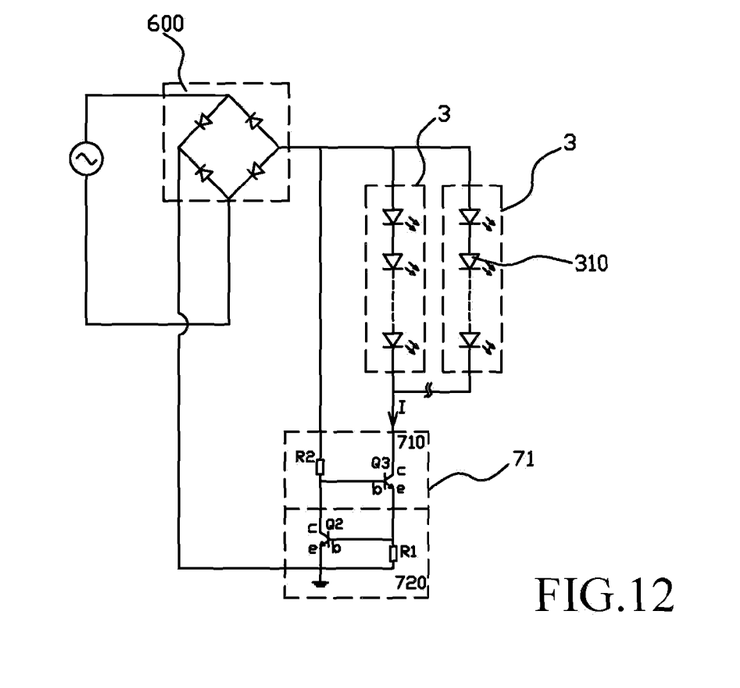
FIG. 12 is a schematic circuit diagram of an LED tube according to the second embodiment of the present invention.
Figure 13:
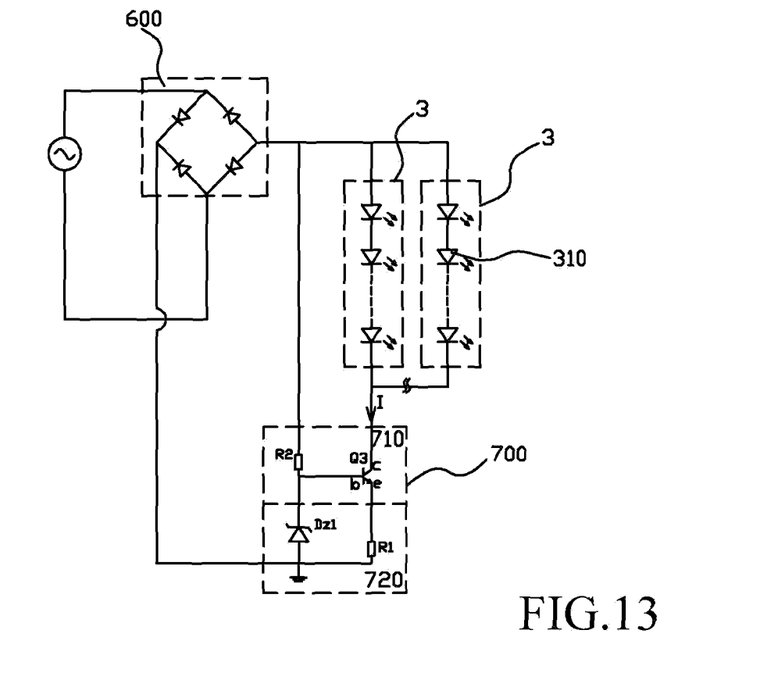
FIG. 13 is a schematic circuit diagram of an LED tube according to the third embodiment of the present invention.
Figure 14:
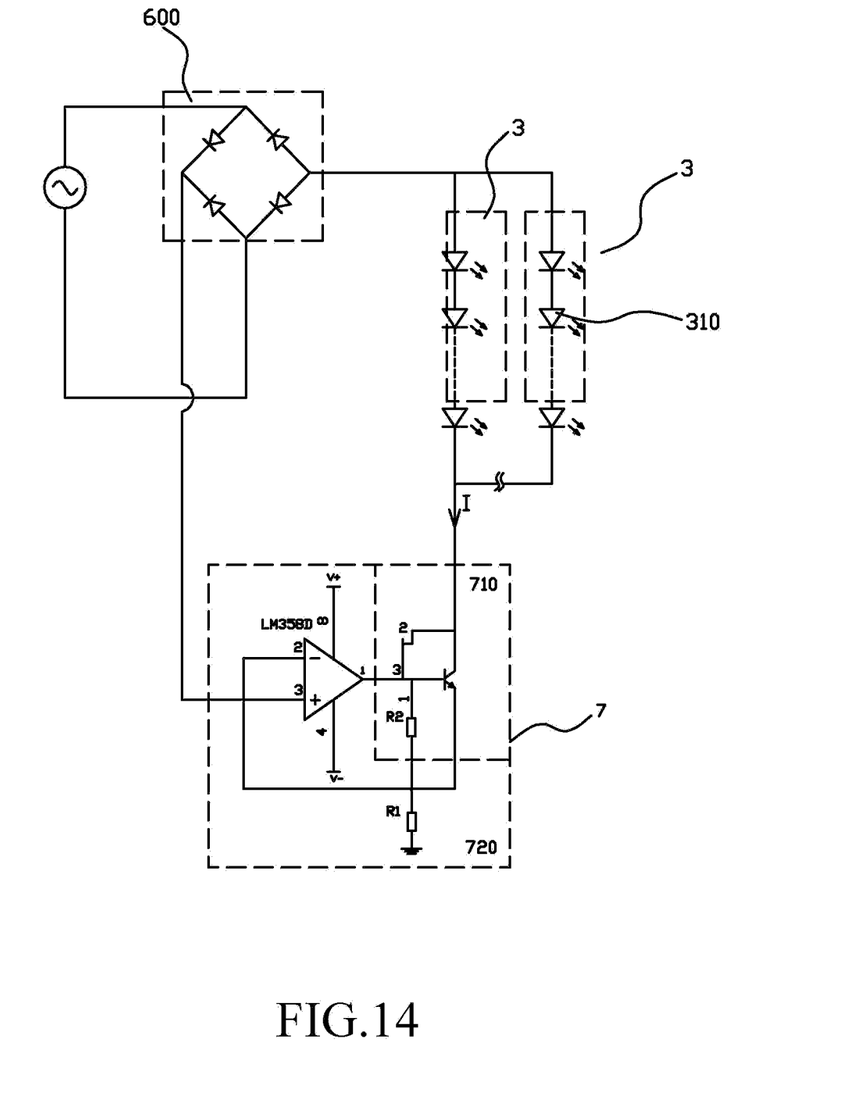
FIG. 14 is a schematic circuit diagram of an LED tube according to the fourth embodiment of the present invention.

In an embodiment of the present invention, as illustrated by FIG. 12, a transistor Q3 could be used and replaces the current negative feedback circuit of the MOSFET Q1; or as illustrated by FIG. 13, a zener diode Dz1 is used and replaces the current negative feedback circuit of the transistor Q2; or as illustrated by FIG. 14, a current feedback circuit of dual op-amp IC LM358D is used in the driving unit 720 for constant current output. FIGS. 12 to 14 only give the examples of the constant current source 700 at low potential relative to the LED module 3, the embodiment of the constant current source 700 at high potential can refer to the preferred embodiment illustrated by FIG. 11, here we will not go further on this point.

The circuit structures used in the present invention, except the above mentioned manner of the combination of bridge rectifier and constant current source, could include more conceptions, described as follows:

As described above, the LED lamp tube disclosed by the present invention uses the LED module 3 disposed on the circuit board 2 as illumination source, it further comprises a pair of electrical connectors 4 with a standard dual-pin configuration mounted on the two ends of the tube 1 and plugged into the conventional fluorescent tube fixture for electrical power connection. The number of the LED module 3 on the circuit board 2 varies according to need, each comprises a serial current-limiting device (usually resistor) and a LED array (LED units in series, parallel or any combination thereof).

Figure 15:
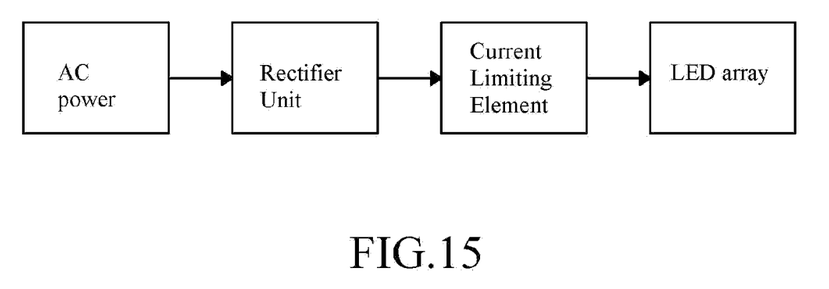
FIG. 15 is a functional block diagram of an LED tube according to another embodiment of the present invention.

FIG. 15 is a circuit functional block diagram, after the electrical connector 4 is plugged into the lamp fixture for power connection; the AC power is converted into DC power directly on the circuit board 2 for use of the LED array, as shown by the FIG. 15. In this embodiment of the present invention, starters, electronic ballasts, switch power supplies or other active or passive components of which lifespans are short and failure rates are high, are no longer required, in comparison with the conventional switching driving circuit LED lamps, the LED lamp tube provided by the present invention so has advantages of low failure rate, high brightness, low operating current, simplified structure, low cost, and high reliability.

Figure 16:
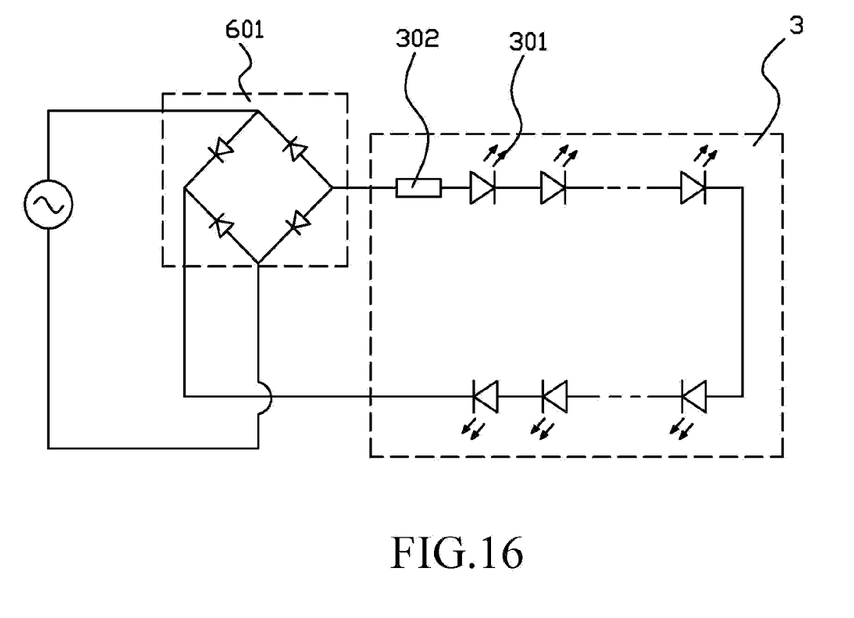
FIG. 16 is a schematic circuit diagram of an LED tube according to the fifth embodiment of the present invention.

A preferred embodiment of the circuit structure according to the conception illustrated in FIG. 15 is shown in FIG. 16, wherein a bridge rectifier 601 is mounted on the circuit board 2 and adjacent to the electrical connector 4, and connected to the LED module 3. The LED module 3 comprising a plurality of series-connected LED units 301, and a current limiting resistor 302 connected to the output of bridge rectifier 601, whereby the AC input is converted into DC output by the bridge rectifier 601 for use by the series-connected LED units 301.

Figure 17:
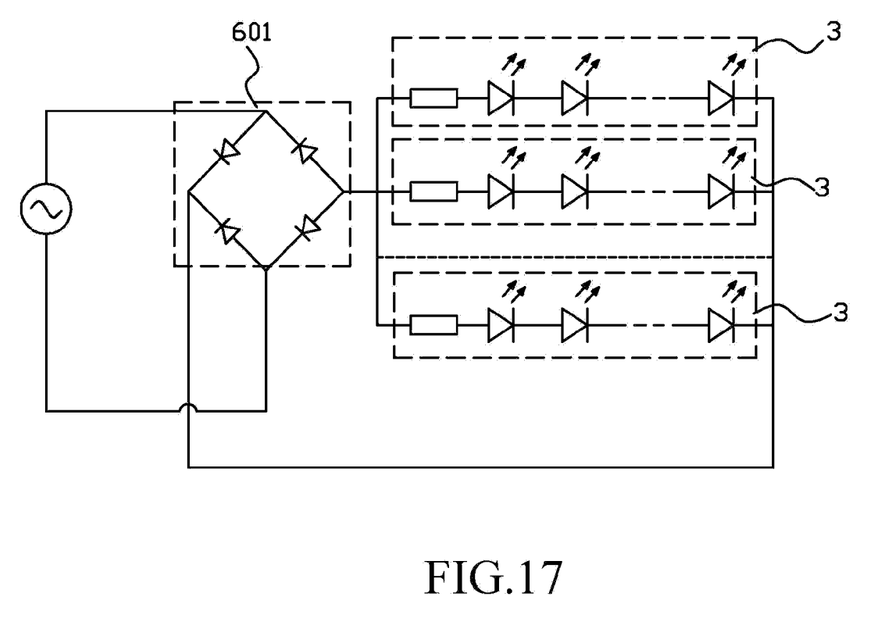
FIG. 17 is a schematic circuit diagram of an LED tube according to the sixth embodiment of the present invention.

FIG. 17 illustrates another embodiment of the circuit used in the present invention, wherein the circuit board 2 comprises at least two parallel-connected LED modules 3, and a bridge rectifier 601, thus when one of the LED modules is disconnected, others still could function properly, so as to improve the reliability of the product.

Figure 18:
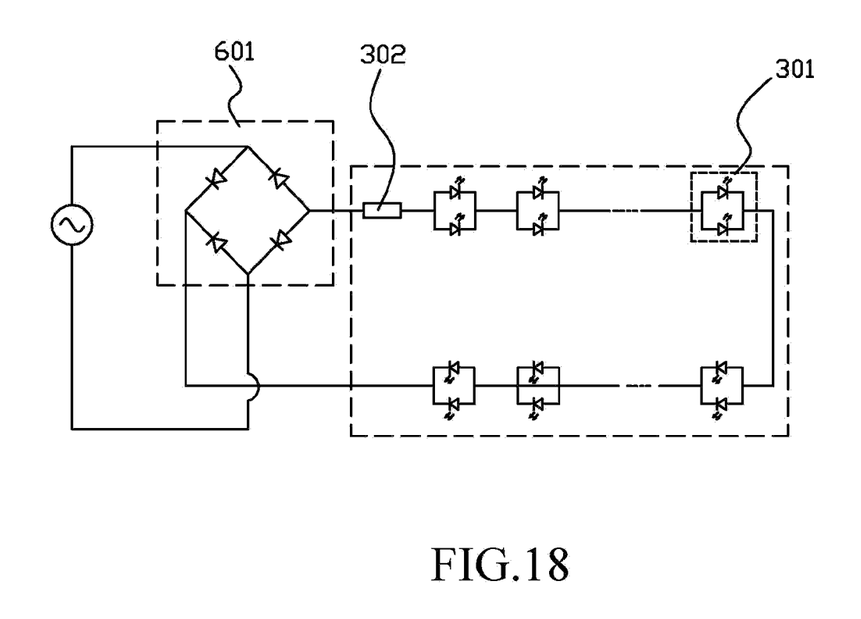
FIG. 18 is a schematic circuit diagram of an LED tube according to the seven embodiment of the present invention.

FIG. 18 illustrates another embodiment of the circuit of the present invention, wherein the LED module 3 comprises a plurality of series-connected LED groups of two parallel-connected LED units, and a serial current limiting resistor 302, whereby a improved product lifespan is obtained, when one of the two parallel connected LED units 301 is disconnected from the circuit due to some reasons, for example, burnt, another still could work as usual to maintain the circuit connection.

Figure 19:
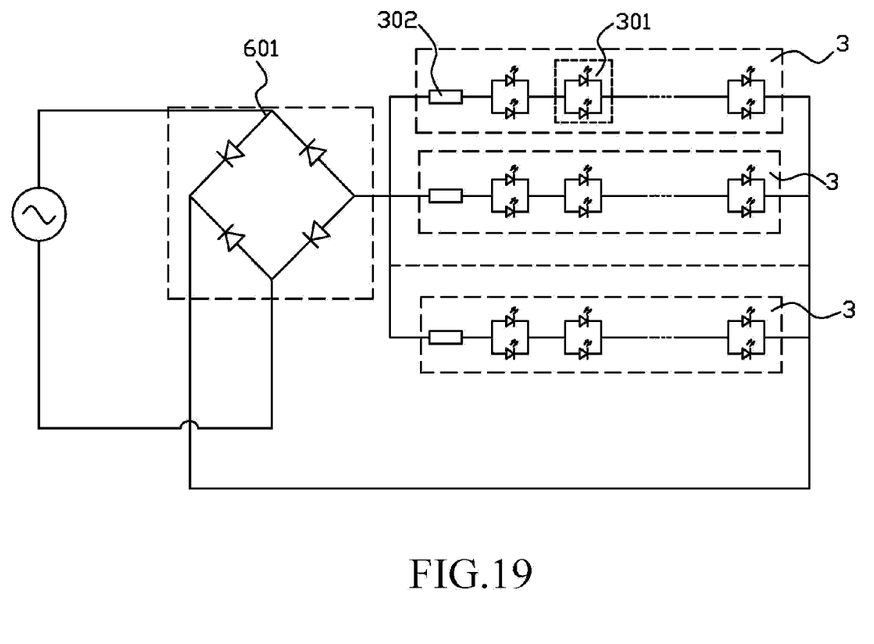
FIG. 19 is a schematic circuit diagram of an LED tube according to the eighth embodiment of the present invention.

FIG. 19 illustrates another embodiment of the circuit of the present invention, combining the circuits illustrated in FIGS. 17 and 18, in this embodiment the circuit board 2 is provided with a plurality of parallel-connected LED modules 3, and each LED module 3 comprises a plurality of series-connected LED groups of two parallel connected LED units 301, and a current limiting resistor 302, whereby better illumination effects and longer lifespan are obtained.

Figure 20:
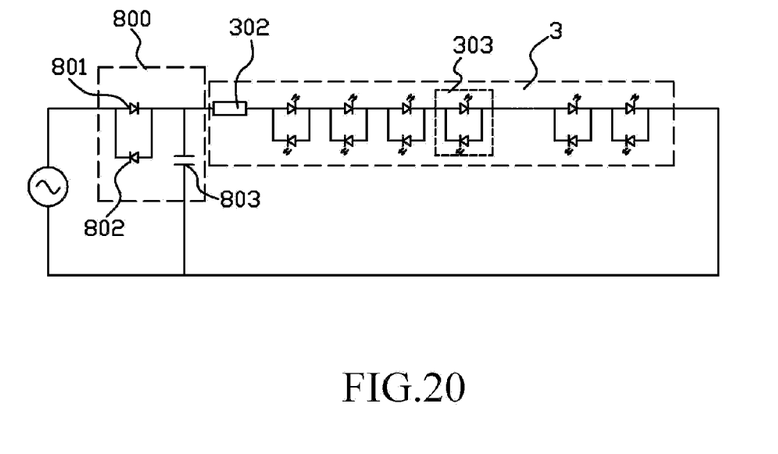
FIG. 20 is a schematic circuit diagram of an LED tube according to the ninth embodiment of the present invention.

FIG. 20 illustrates one more embodiment of the circuit of the present invention, in this embodiment the rectifier on the circuit board 2 is a dual half-wave rectifier 800, comprising two inverse parallel connected rectifying diode 801, 802, and a non polar capacitor 803, its input is connected to an AC power source whiles its output is connected to the LED module 3. In this embodiment the LED module 3 comprises a plurality of series connected groups 303 of two inverse parallel connected LED units 301, and a serial current limiting resistor 302. The two inverse parallel connected diodes 801, 802 form a dual half wave rectification to provide both positive and negative output voltages, with each output utilizing half of the incoming AC cycle. Thus, the LED units 301 connected in forward direction in every LED group 303 come on in the positive half cycles of AC and the inverse connected LED units in every LED group 303 come on in the negative cycles of AC, LEDs alternately illumine, and due to the factors of the continuous charge and discharge of the capacitor 803, the commercial power frequency, and more particularly the human eye persistence, the flicker is imperceptible to users.

Figure 21:
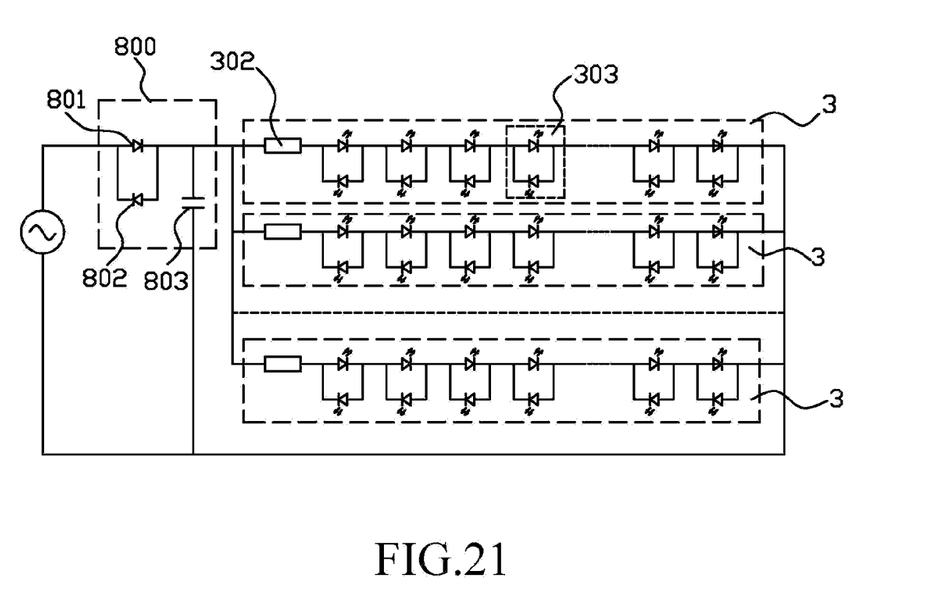
FIG. 21 is a schematic circuit diagram of an LED tube according to the tenth embodiment of the present invention.

FIG. 21 illustrates another embodiment of the circuit of the present invention, wherein, based on the above embodiment, the circuit board 2 comprises a plurality of parallel connected LED modules 3, and works in the same way as described in the above embodiment.

Figure 22:
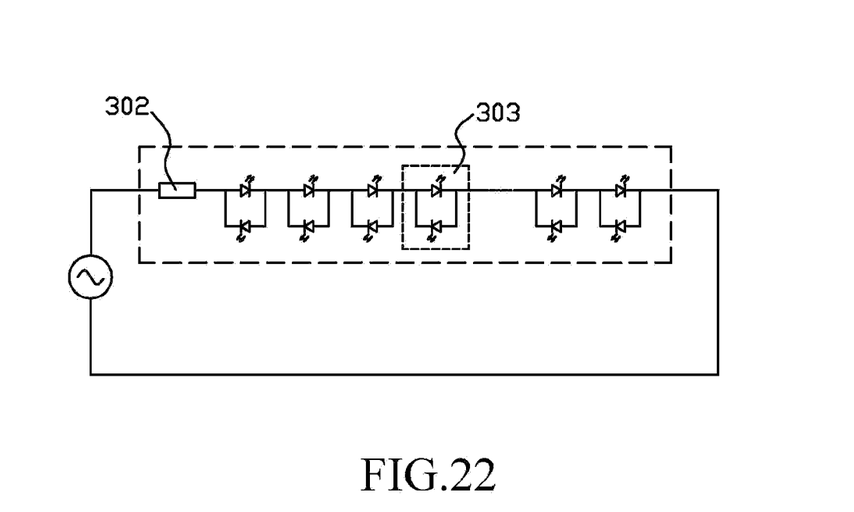
FIG. 22 is a schematic circuit diagram of an LED tube according to the eleventh embodiment of the present invention.
Figure 23:
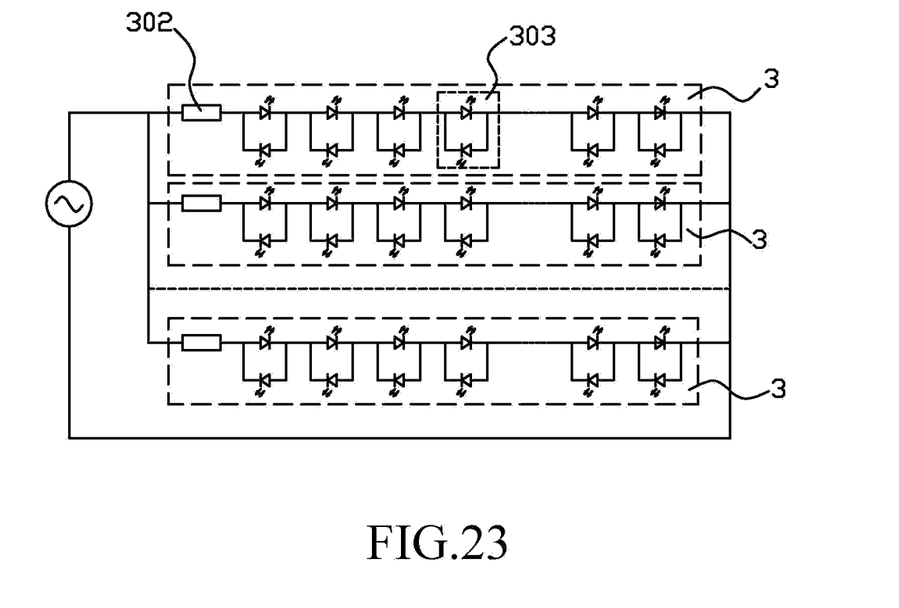
FIG. 23 is a schematic circuit diagram of an LED tube according to the twelfth embodiment of the present invention.

Of course, the aforementioned dual half wave rectifier 800 is usually working with an incoming power frequency less than 60 Hz, but once the power frequency excesses 50 Hz, human eyes already could not recognize the flicker. Thus, an arrangement of the LED module 3, wherein every two LED units are inverse parallel connected and then altogether in series, could be directly connected to the AC power through the serial current limiting resistor 302, two embodiments according to this arrangement are shown in FIGS. 22 and 23. In the embodiment shown in FIG. 22, only one LED module 3 is used, but in the embodiment shown in FIG. 23, a plurality of LED modules 3 are used for higher brightness and system redundancy. The LED units in forward direction come on in the positive half cycle only and the others come on in the negative half cycle only, lighting alternately.

The above-mentioned technical solutions not only can provide excellent illumination efficiency and effects, but also can allow the LED units 301 to have a certain period of buffering time, the heat generated by the LED module 3 is therefore reduced, and in combination with the structure of tube body 1 described above, the object of the present invention of providing a LED lamp tube with better illumination effects, enhanced heat dissipation and longer lifespan is so achieved.

While there have been shown and described what are at present considered to be some of the embodiments of the invention, it will be apparent to those skilled in the art that various changes and modifications can be made herein without departing from the scope of the invention as defined by the claims of the present invention. The product can use a relatively simple structure and material, which caters to large scale production and has the prospect to easily replace present fluorescent lamp tubes and other lighting lamp tubes.

The invention claimed is:

1. A light emitting diode (LED) lamp tube, comprising:
a tube body;
at least two circuit boards, mounted inside said tube body and each circuit board provided with at least one LED module; and
electrical connectors mounted at two ends of said tube body;
characterized in that:
said tube body is a one-piece hollow tube, and along its length direction has an arc-shaped strip inside, whose back side clings to the inner wall of said tube body;
said arc-shaped strip has supporting and positioning ribs integrally formed on the front side of said arc-shaped strip and symmetrically arranged relative to the vertical axis of the tube, and each supporting and positioning rib clamps and fixes a respective circuit board, whereby both circuit boards are arranged in a separated reverse V shape;
said arc-shaped strip further has an integrated rib between the supporting and positioning ribs, and said integrated rib has a locking hole on each end thereof, and each said electrical connector is fixed on a corresponding locking hole by a bolt;
each circuit board is elongated, its two opposite ends are clamped and fixed in said tube body by one of the supporting and positioning ribs, and said at least one LED module is disposed on the front side of each circuit board; and
each said electrical connector comprises two protruding electrode pins for connecting said lamp tube to standard fluorescent lamp fixtures, wherein said two electrode pins are short-circuited.

2. The LED lamp tube according to claim 1, wherein said tube body has integrated reinforcing ribs on the inner wall hereof, which support and position said arc-shaped strip.

3. The LED lamp tube according to claim 1, wherein said integrated reinforcing ribs are integrally formed on the inner wall of said tube body.

4. The LED lamp tube according to claim 3, wherein said tube body along its length direction has one or more integrated auxiliary reinforcing ribs on the inner wall thereof.

5. The LED lamp tube according to claim 3, wherein said tube body has two symmetrically arranged groups of supporting and positioning ribs relative to the vertical axis thereof, each group of supporting and positioning ribs clamp and fixes one circuit board, whereby two circuit boards are arranged in a separated reverse V shape.

6. The LED lamp tube according to claim 1, wherein a gap is formed between said two groups of supporting and positioning ribs, in which a metal strip is clamped and fixed.

7. The LED lamp tube according to claim 1, wherein said tube body has integrated wave-shaped stripes.

8. The LED lamp tube according to claim 1, wherein each LED module comprises one or more LED units connected in series, and each circuit board comprises one or more LED modules connected in parallel.

9. The LED lamp tube according to claim 8, wherein each circuit board comprises a bridge rectifier connected with said one or more LED modules, and a constant current source in series for current limiting.

10. The LED lamp tube according to claim 1, wherein said constant current source comprises a constant-current execution unit and a constant current driving unit.

11. The LED lamp tube according to claim 1, wherein each LED module comprises a serial current limiting resistor and at least one LED unit, and said circuit board comprises one or more LED modules connected in parallel.

12. The LED lamp tube according to claim 11, wherein each circuit board comprises a bridge rectifier connected with said one or more LED modules.

13. The LED lamp tube according to claim 12, wherein every two or more said LED units of an LED module are first connected together in parallel, then altogether in series.

14. The LED lamp tube according to claim 11, wherein each said circuit board comprises a dual half wave rectifier connected with said one or more LED modules.

15. The LED lamp tube according to claim 14, wherein said dual half wave rectifier comprises two inverse-parallel connected diodes, and a non-polar capacitor.

16. The LED lamp tube according to claim 14, wherein every two said LED units of an LED module are first inverse-parallel connected together, then altogether in series.

17. The LED lamp tube according to claim 11, wherein every two said LED units of an LED module are first inverse-parallel connected together, then altogether in series.

* * * * *